United States Patent
Schwartz et al.

(10) Patent No.: US 10,655,984 B2
(45) Date of Patent: May 19, 2020

(54) POWER STATE ESTIMATION FOR POWER GRID SERVICED PREMISES

(71) Applicant: Florida Power & Light Company, Juno Beach, FL (US)

(72) Inventors: Eric D Schwartz, Palm Beach Gardens, FL (US); Ronald A Capute, Palm Beach Gardens, FL (US)

(73) Assignee: FLORIDA POWER & LIGHT COMPANY, Juno Beach, FL (US)

( * ) Notice: Subject to any disclaimer, the term of this patent is extended or adjusted under 35 U.S.C. 154(b) by 196 days.

(21) Appl. No.: 15/848,720

(22) Filed: Dec. 20, 2017

(65) Prior Publication Data

US 2019/0186952 A1   Jun. 20, 2019

(51) Int. Cl.
| | | |
|---|---|---|
| *G01D 4/00* | (2006.01) | |
| *H04L 12/707* | (2013.01) | |
| *H02J 13/00* | (2006.01) | |

(52) U.S. Cl.
CPC ............ *G01D 4/004* (2013.01); *H04L 45/22* (2013.01); *H02J 13/0062* (2013.01); *H02J 13/0079* (2013.01)

(58) Field of Classification Search
CPC .................. G01R 31/085; G01D 4/004; H04B 2203/5433; H04L 43/10; H04L 45/22; Y02B 90/242
See application file for complete search history.

(56) References Cited

U.S. PATENT DOCUMENTS

| | | | |
|---|---|---|---|
| 6,687,574 B2 | 2/2004 | Pietrowicz et al. | |
| 7,853,417 B2 | 12/2010 | Vaswani et al. | |
| 8,171,364 B2 | 5/2012 | Veillette | |
| 2006/0217936 A1* | 9/2006 | Mason ................... | G01D 4/004 702/188 |
| 2007/0013547 A1* | 1/2007 | Boaz ..................... | G01D 4/002 340/870.02 |
| 2007/0211401 A1* | 9/2007 | Mak ....................... | H02H 7/261 361/119 |
| 2011/0077790 A1* | 3/2011 | Vaswani ................ | G01D 4/004 700/291 |
| 2012/0200426 A1* | 8/2012 | DiLuciano .......... | H04L 41/0645 340/870.07 |
| 2016/0011252 A1* | 1/2016 | Kang ................... | G01R 31/021 702/59 |

(Continued)

*Primary Examiner* — Santosh R Poudel
(74) *Attorney, Agent, or Firm* — Tarolli, Sundheim, Covell & Tummino LLP (57) ABSTRACT

An outage estimator that generates outage data characterizing a power state for a number of premises serviced by a power grid, the number of premises comprising a first set of the premises and a second set of the premises different from the first set of the premises. The generating includes executing a first stage analysis that estimates the power state for the first set of the premises associated with a set of transformers coupled to a first feeder in the power grid in response to detecting an event message from a smart meter associated with the first set of the premises. The generating also includes executing a second stage analysis that estimates the power state for a second set of premises associated with a set of laterals coupled to a second feeder in the power grid in response to detecting that no event messages have been provided from smart meters associated with the second set of the premises within a predetermined amount of time.

20 Claims, 6 Drawing Sheets

(56) References Cited

U.S. PATENT DOCUMENTS

2016/0018458 A1* 1/2016 Basu .................... G01R 31/088
                                                    702/59
2017/0256153 A1* 9/2017 Klein .................. H02J 13/0075

* cited by examiner

POWER STATE ESTIMATION FOR POWER GRID SERVICED PREMISES

TECHNICAL FIELD

The present disclosure relates to systems and methods for estimating a power state of premises serviced by a power grid.

BACKGROUND

Electrical power distribution grids can be implemented as radial, loop or network type systems. The distribution grids are arranged and interconnected to a substation in different ways depending on the type of system configuration. However, for each type of distribution system configuration, the distribution circuits (commonly referred to as feeders and lateral feeders) distribute power delivered from the substation to loads at premises coupled to the grid through smart meters.

A smart meter is an electronic device that records consumption of electric energy in intervals of an hour or less and communicates that information at least daily back to a utility provider for monitoring and billing. Smart meters enable two-way communication between the meter and the utility provider. Unlike home energy monitors, smart meters can gather data for remote reporting. Such an advanced metering infrastructure (AMI) differs from traditional automatic meter reading (AMR) in that AMI enables two-way communications with the meter.

SUMMARY

One example relates to a non-transitory machine readable medium having machine executable instructions. The machine executable instructions includes an outage estimator that generates outage data characterizing a power state for a number of premises serviced by a power grid, the number of premises comprising a first set of the premises and a second set of the premises different from the first set of the premises. The generating includes executing a first stage analysis that estimates the power state for the first set of the premises associated with a set of transformers coupled to a first feeder in the power grid in response to detecting an event message from a smart meter associated with the first set of the premises. The generating also includes executing a second stage analysis that estimates the power state for a second set of premises associated with a set of laterals coupled to a second feeder in the power grid in response to detecting that no event messages have been provided from smart meters associated with the second set of the premises within a predetermined amount of time.

Another example relates to a system that can include a memory for storing machine executable instructions and a processing unit comprising one or more processor cores that access the memory and executes the machine readable instructions. The machine readable instructions include a map system that generates a request for outage data for a number of premises serviced by a power grid that are within a service boundary. The number of the premises includes a first set of the premises and a second set of the premises different from the first set of the premises. The machine readable instructions also include a smart meter monitor that sends pings to and receives event messages from smart meters installed at the number of the premises via a utility network. The machine readable instructions further include an outage estimator that generates the outage data in response to the request. The outage data characterizes a power state for the number of the premises. The generating includes executing a first stage analysis that estimates the power state for the first set of the premises associated with a set of transformers coupled to a first feeder in the power grid in response to detecting an event message from a smart meter associated with the first set of the premises. The generating also includes executing a second stage analysis that estimates the power state for the second set of the premises associated with a set of laterals coupled to a second feeder in the power grid in response to detecting that no event messages have been provided from smart meters associated with the second set of the premises within a predetermined amount of time.

Yet another example relates to a method that includes receiving a request for outage data characterizing a power state for a number of premises serviced by a power grid. The method also includes executing a first stage analysis for a first set of premises of the number of the premises coupled to a first feeder of the power grid to generate the outage data. At least one event message from a smart meter coupled to the first feeder indicates that an associated premises is without power. The executing of the first stage analysis includes requesting a ping for sets of two smart meters coupled to each transformer coupled to the first feeder and estimating the power state for the first set of premises of the number of the premises for the outage data based in part on the results of the pings to the sets of two smart meters coupled to each transformer. The executing also includes executing a second stage analysis on a second feeder of the power grid, wherein no event messages have been received from smart meters coupled to the second feeder for a predetermined amount of time to refine the outage data. The executing of the second stage analysis includes requesting a ping for sets of two smart meters coupled to each lateral coupled to the second feeder and estimating the power state for a second set of premises of the number of the premises for the outage data based in part on the results of pings to the sets of two smart meters coupled to each lateral coupled to the second feeder. The method further includes outputting a map characterizing the outage data.

DETAILED DESCRIPTION

This disclosure relates to an outage estimator executing on a utility server that generates outage data characterizing a power state for premises serviced by a power grid. To generate the outage data, the outage estimator can execute a first stage analysis and a second stage analysis on feeders of the power grid. In particular, in the first stage analysis, the outage estimator identifies a set of feeders in the power grid for which an event message has been received from a downstream smart meter indicating that an associated power consuming premises (premises) is without power.

During the first stage analysis of a given feeder in the first set of feeders, the outage estimator requests a ping of a set of smart meters coupled downstream from each transformer from the given feeder. Based on the results of the pings, the outage estimator estimates the power state for the given feeder. The remaining feeders in the first set of feeders are analyzed in a similar way.

In the second stage analysis, the outage estimator identifies a second set of feeders in the power grid. The second set of feeders were not analyzed in the first stage analysis. Moreover, no event messages have been received from smart meters downstream from the second set of feeders within a predetermined amount of time (e.g., 10-60 minutes). During the second stage analysis of a given feeder in the second set of feeders, the outage estimator requests a ping to a set of smart meters (e.g., a first and last smart meter) coupled downstream to each lateral of the given feeder. Based on the results of these pings, the outage estimator estimates the power state for the given feeder. The remaining feeders in the second set of feeders are analyzed in a similar way. In this manner, the outage estimator generates the outage data that characterizes a relatively accurate estimate of the power state of the premises serviced by the power grid without having to ping each smart meter on the power grid. Further, the estimation is based on actual communication with smart meters that confirm the power state.

Moreover, the outage data can be employed by a meter system of the utility server to generate a map (e.g., a heat map) with visual indicia (e.g., heat spots) representing the power state of the premises serviced by the power grid. Moreover, a viewer of the map (e.g., a user) can adjust a size and scale of the map (e.g., in a zooming function) and the outage data can be updated by the outage estimator accordingly.

Figure 1:
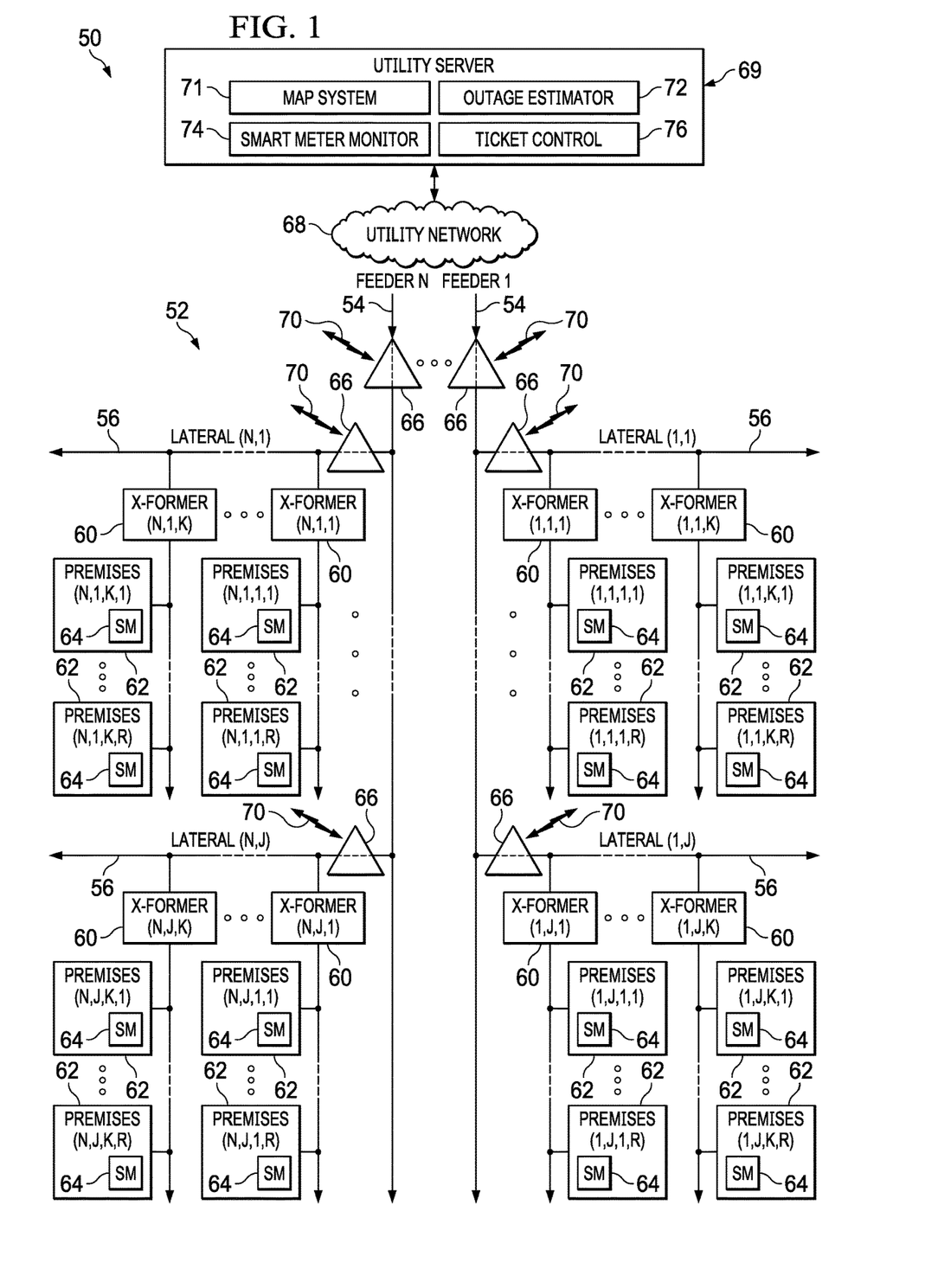
FIG. 1 illustrates an example of an electric power distribution system that includes an outage estimator that estimates a power state for premises serviced by a power grid.

FIG. 1 illustrates an example of an electric power distribution system 50 that can estimate a power state for a number of power consuming premises. The system 50 includes a power grid 52. For purposes of simplification of explanation, only some of the elements of the power grid 52 are illustrated. However, it is understood, that elements of the power grid 52 that are not shown in FIG. 1 can be implemented in a similar or different manner.

The power grid 52 can include N number of feeders 54 that distribute electric power, where N is an integer greater than one. Each of the N number of feeders 54 receives power from a substation coupled (via an electric power line) to a power generation source. Each feeder 54 can be formed as a power line (e.g., an electric power line). Moreover, each of the N number of feeders 54 can include J number of laterals 56, where J is an integer greater than or equal to one.

Each of the J number of laterals 56 is coupled to K number of transformers 60 (distribution transformers; labeled in FIG. 1 as "X-FORMER"), where K is an integer greater than or equal to one. Moreover, each of the transformers 60 are coupled to R number of power consuming premises 62 ("premises 62"), where R is an integer greater than or equal to one. Each of the premises 62 includes a smart meter 64 (labeled in FIG. 1 as "SM") installed therein. For purposes of simplification of explanation, it is presumed that communications with each premises 62 could be with the smart meter 64. Each power grid element (e.g., an electrical component) in the power grid 52 has a logical position and a physical location (hereinafter, referred to as a "location"). Moreover, the logical position of each power grid element is identifiable by an index number and a unique alpha numeric value. The index number of a given component identifies upstream components of the given component. For example, the Jth lateral 56 on the first feeder 54 can be referenced as LATERAL (1,J). Similarly, the Rth premises 62 coupled to the Kth transformer 60, the Jth lateral 56 and the Nth feeder 54 can be referred to as premises (N,J,K,R). Thus, the index number identifies the logical position of each power grid element. Moreover, it is understood that in some examples, a network address (e.g., an Internet Protocol (IP) address) can be employed as a unique identifier of a smart meter 62. In such a situation, the network address can be cross-referenced to an index number. Further, it is understood the values of J, K and R may be the same or different for each branch of the power grid 52.

Each feeder 54 and lateral 56 (or some subset thereof) has a fault indicator 66 installed. The fault indicators 66 can wirelessly communicate with a utility network 68, as indicated by lines 70. Similarly, the smart meter 64 of each premises 62 can communicate with the utility network 68. The utility network 68 could be implemented as a mesh network, such as an advanced metering infrastructure (AMI) network.

A utility server 69 is also coupled to the utility network 68. The utility server 69 can be representative of a plurality of servers (e.g., a server farm) executing application software implemented to facilitate operations of a utility provider (e.g., a power company). The plurality of servers represented by the utility server 69 could be local computer devices (e.g., server blades) operating at a single premises and/or distributed across multiple facilities, such as in a computing cloud.

For purposes of simplification of explanation, only sixteen (16) premises 62 of the plurality of premises 62 is illustrated, but it is to be understood that there could be hundreds, thousands or millions of instances of the premises 62 served by the power grid 52. The premises 62 could be representative of a domicile (e.g., a house or apartment), an office building, and industrial complex, or nearly any facility that is configured to receive power service from the power grid 52.

The utility server 69 includes a map system 71 executing thereon. The map system 71 is programmed to provide a graphical user interface (GUI) that outputs a map depicting a representation of a geographic area serviced by the power grid 52, or a partition thereof. The map system 71 could be implemented, for example, as a mapping system that outputs visual indicia (e.g., heat spots, icons, etc.) representing a power status for the premises 62 in the map. In particular, in response to user input and/or automatically, the map system 71 can request outage data from an outage estimator 72 of the utility server 69. The request can include a service boundary depicted by the map, which service boundary can be changed in response to user input (e.g., zoom in or zoom out).

The outage estimator 72 is programmed to generate the outage data that characterizes the power state of the premises 62 serviced by the power grid 52. The outage data can be stored in one or more electronic records (e.g., records of a database). As used herein, the term "power state" denotes a state of having power or being without power. Additionally, the outage data includes an outage number that represents an estimate of the number of premises 62 that are currently without power (experiencing a power outage) and a number of the premises 62 that have power within the service boundary. As described herein, the outage data can be updated in real-time (e.g., about every ten minutes) such that the outage data provides a relatively accurate updated estimate of the power state of the premises 62.

In some examples, the map system 71 generates the request for the outage data (including the outage number) in response to a major environmental event that is likely to affect power service of the power grid 52. The major environmental event could be, for example, a hurricane, an earthquake, a tornado, a widespread blackout (power outage), etc. Additionally or alternatively, the map system 71 may request the outage data for other reasons. In still other examples, the outage estimator 72 could be programmed to generate the outage data periodically and/or asynchronously, where no request was provided.

The outage estimator 72 cooperates with a smart meter monitor 74 to generate the outage data. The smart meter monitor 74 communicates with the smart meters 64 at each of the premises 62 coupled to the power grid 52 via the utility network 68. In particular, the smart meter monitor 74 records event messages that may be periodically and/or asynchronously provided from the smart meters 64 at each of the premises 62. The event messages can include usage data for an associated premises 62. Additionally, the smart meter monitor 74 can ping (e.g., a status check request) the smart meters 64 at each of the premises 62 for usage data. In response to receipt of a ping, a given smart meter 64 provides the usage data to the smart meter monitor 74 via the utility network 68. The usage data can indicate an input (incoming) voltage observed by the given smart meter 64, and consumption data that characterizes an amount of power (e.g., in kilowatts (kW)) consumed by the corresponding premises 62.

In some situations, the usage data in an event message from a smart meter 64 may indicate that a particular (single) premises 62 is without power (experiencing a power outage). For instance, in some examples, each smart meter 64 can include a capacitor that allows the smart meter 64 to continue to operate for a brief time (e.g., one (1) second or less) after a loss of power. In such a situation, if the smart meter 64 detects a loss of power, the smart meter 64 may generate a "last gasp" event message that indicates that the particular premises 62 is without power. It is also considered that if the smart meter 62 includes a battery backup, the smart meter 62 may provide usage data in an event message indicates that the smart meter 64 has 0 Volts (V) incoming, it is presumed that the particular premises 62 is without power. Alternatively, if a smart meter 64 of the particular premise 62 does not respond to a ping (e.g., timeout), it is presumed that the particular premises 62 is without power.

The outage estimator 72 generates and updates the outage data in stages (waves) of analysis. In a first stage analysis, the outage estimator 72 identifies each of the N number of feeders 54 of the power grid 52 that are within the service boundary identified by the map system 71. For purposes of simplification of explanation, it is presumed that each of the N number of feeders 54 are within the service boundary, but in other examples, the service boundary may have a subset of the N number of feeders 54.

The outage estimator 72 queries the smart meter monitor 74 for the most recent smart meter event messages for smart meters 64 that are within the service boundary defined by the map system 71. For each of the N number of feeders 54 in the service boundary, the outage estimator 72 parses the meter event messages to identify a most upstream smart meter 64 that indicates a power state of a corresponding premises 62 within a predetermined amount of time (e.g., 10-60 minutes).

As used herein, the terms "upstream" and "downstream" refers to the logical position of a grid element relative to a substation. A more "upstream" grid component is closer to a substation for the power grid 52. For instance, in the power grid 52 illustrated, the premises (1,1,1,1) is "more upstream" on the Feeder 1 than the premises (1,J,1,1) and the premises (1,1,K,R).

In a given example (hereinafter, "the given example"), it is presumed that the smart meter 64 at premises (1,1,1,1) has reported that the premises (1,1,1,1) is without power (power outage) in the event message parsed by the outage estimator 72. Accordingly, the outage estimator 72 requests that the smart meter monitor 74 ping the smart meter 64 at the premises (1,1,1,1). In response, the smart meter monitor 74 pings the smart meter 64 at the premises (1,1,1,1) for usage data. The smart meter monitor 74 forwards the response or an indication of a timeout (if no response is received) to the outage estimator 72.

If the usage data indicates that the first premises 62 (premises (1,1,1,1) in the given example) has power, the outage estimator 72 requests a ping to a second smart meter 64 on the same transformer 60 (namely, transformer (1,1,1) in the given example). In the given example, it is presumed that the outage estimator 72 sends a request for a ping of the premises (1,1,1,2) (not shown) to the smart meter monitor 74. In response, the smart meter monitor 74 executes the ping of the smart meter 64 at the premises (1,1,1,2) and forwards the returned usage data (or an indication of a timeout) to the outage estimator 72. If the usage data indicates that the second premises 62 has power, the outage estimator 72 presumes that all of the premises 62 electrically coupled downstream from that transformer 60 have power. Thus, in the given example, the outage estimator 72 would presume that if both premises (1,1,1,1) and premises (1,1,1,2) have power, that premises (1,1,1,1) to premises (1,1,1,R) each have power. In this situation, the outage estimator 72 records the status of the associated transformer 60 (transformer (1,1,1) in the given example) as being online (having power) in the outage data. Additionally, the outage estimator 72 could records premises (1,1,1,1) to premises (1,1,1,R) as having power in the outage data.

If a timeout (no response to the ping) indicates that the first premises 62 (premises (1,1,1,1) in the given example) does not have power (experiencing a power outage), the outage estimator 72 requests a ping to a second smart meter 64 on the same transformer 60 (namely, transformer (1,1,1) in the given example). In the given example, it is presumed that the outage estimator 72 sends a request for a ping of the premises (1,1,1,2) (not shown) to the smart meter monitor 74. In response, the smart meter monitor 74 executes the ping of the smart meter 64 at the premises (1,1,1,2) and forwards the returned usage data (or an indication of a timeout) to the outage estimator 72. If a timeout to ping (no response to a ping) indicates that the second premises 62 does not have power, the outage estimator 72 presumes that the associated transformer 60 does not have power. Thus, in the given example, the outage estimator 72 would presume that since neither the premises (1,1,1,1) nor the premises (1,1,1,2) have power, that the premises (1,1,1,1) to premises (1,1,1,R) are each experiencing a power outage. In this situation, the associated transformer 60 (transformer (1,1,1) in the given example) is recorded in the outage data as being offline (experiencing a power outage). Additionally, in this situation, the outage estimator 72 records premises (1,1,1,1) to premises (1,1,1,R) as being without power in the outage data.

In other situations, if the first smart meter 64 (for premises (1,1,1,1) in the given example) has power service but the second smart meter 64 (for the premises (1,1,1,2) in the given example) does not have power service, or vice versa, the outage estimator 72 requests individual pings of the smart meter 64 for each premises 62 coupled to the associated transformer 60. In the given example, the outage estimator 72 would request a ping to the smart meter 64 of the premises (1,1,1,1) to premises (1,1,1,R). The results of the individual pings (usage data or a timeout) are employed by the outage estimator 72 record to the power state for each premises 62 associated with an individually pinged smart meter 64 in the outage data. Additionally, the outage estimator marks the associated transformer 60 as having an unknown or indeterminate status for the outage data.

Upon estimating the status for each premises 62 that is the most upstream on the first feeder 52, the outage estimator 72 evaluates a status of premises 62 associated with transformers 60 downstream from the first transformer 60. In the given example, the outage estimator 72 could evaluate the power status of the premises 62 coupled to the transformer (1,1,2) (not shown).

Evaluation of the premises 62 coupled to transformers 60 downstream from the most upstream transformer 60 is similar to the evaluation of the premises 62 at the most upstream transformer 60 of the feeder 54. In particular, for each downstream transformer 60, the outage estimator 72 requests pings for two smart meters 64 at two premises 62. If results of the pings indicate that both premises 62 have power, the outage estimator 72 marks the associated transformer 60 as being online (having power) in the outage data. Additionally, in this situation, the outage estimator records each of the associated premises 62 as having power in the outage data. If the results of the pings indicate that both premises 62 are without power, the outage estimator 72 marks the associated transformer 60 as being offline (power outage) in the outage data. Additionally, in this situation, the outage estimator 72 records each of the associated premises 62 as being without power in the outage data.

Additionally, if the results of the pings indicates that one of the premises 62 has power and the other premises 64 is without power, the outage estimator 72 request pings of each smart meter 64 of the associated transformer 60 and employs individual ping results to record the power state of the associated premises 62 in the outage data.

Upon evaluating the smart meters 64 attached to each transformer of the first feeder 54, the outage estimator 72 repeats the first stage analysis for each feeder 54 of the N number of feeders 54 for which event messages smart meters 64 are received within the predetermined amount of time (e.g., 10-60 minutes). The results of the first stage analysis is employed to determine the outage.

Additionally, the outage estimator 72 can also execute a second stage analysis to generate/refine the outage data. In the second stage analysis, the outage estimator 72 evaluates regions of the power grid 52 wherein event messages have not been received from smart meters 64 within a predetermined amount of time (e.g., 10-60 minutes) or the number received is below a predetermined threshold (e.g., ten or less). In situations where portions of the power grid 52 goes offline (loses power), some of the smart meters 64 may not have sufficient power to send event messages. Thus, the outage estimator 72 skips the sections of the power grid 52 that were analyzed in the first stage analysis. Accordingly, in the second stage analysis, the outage estimator 72 requests pings of smart meters 64 associated with grid elements that were not evaluated in the first stage analysis. The grid elements could be, for example, feeders 54, laterals 56 and/or transformers 60.

Continuing with the given example, it is presumed that the Nth feeder 54 (feeder N) was not evaluated in the first stage of analysis. The outage estimator 72 requests pings for smart meters 64 on each of the laterals 56 of the feeder 54, starting at a nearest (in logical position) to a feeder head. For a given lateral, the outage estimator 72 requests pings for the first and last smart meters 64 (in logical position) of the given lateral. Thus, in the given example, the outage estimator 72 requests pings for the smart meters 64 associated with the premises (N,1,1,1) and the premises (N,1,K,R). The results of the ping (or lack thereof) are employed by the outage estimator 72 to update the outage data in a manner described herein.

In particular, if both smart meters 64 of the premises 62 (premises (N,1,1,1) and the premises (N,1,K,R) in the given example) provide usage data indicating the both of the premises 62 have power, the outage estimator 72 presumed that every premises 62 coupled to the associated lateral has power. Thus, in the given example, it would be presumed and recorded in the outage data that the premises (N,1,1,1) to premises (N,1,K,R) each have power.

Alternatively, if both smart meters 64 of the premises 62 (premises (N,1,1,1) and the premises (N,1,K,R) in the given example) timeout in response to the pings, indicating the both of the premises 62 are without power, the outage estimator 72 presumed that every premises 62 coupled to associated lateral 56 are without power. Thus, in the given example, it would be presumed and recorded in the outage data that the premises (N,1,1,1) to premises (N,1,K,R) each are without power.

As another alternative, if the usage data (or a timeout) for one of the smart meters 64 of the premises 62 (premises (N,1,1,1) or the premises (N,1,K,R) in the given example) has power and one of the smart meters 64 is without power, the outage estimator 72 evaluates one smart meter 64 for each transformer 60 on the associated lateral 56. Moreover, if the smart meter 64 indicates that a given premises 62 has power the outage estimator 72 presumes and records in the outage data that the transformer 60 is online (has power) and that each premises 62 associated with that transformer 60 also has power. Conversely, if the smart meter 64 (via a timeout) indicates that a given premises 62 is without power, the outage estimator 72 presumes and records in the outage data that the transformer 60 is offline (has no power) and that each premises 62 associated with that transformer 60 is also with power.

In the given example, it is presumed that the smart meter 64 associated with the premise (N,1,1,1) has power and the premises (N,1,K,R) is without power. Thus, in the given example, the outage estimator 72 presumes and records in the outage data that premises (N,1,1,1) to premises (N,1,1,R) each have power and that premises (N,1,K,1) to premises (N,1,K,R) each are without power. Additionally, continuing with the given example, the outage estimator 72 requests a ping for one a smart meter 64 associated with each transformer (N,1,2) to transformer (N,1,K−1) and the responses (or lack thereof) to the pings are employed in a similar manner.

The outage estimator 72 evaluates each lateral 56 for the associated feeder 54 in a similar manner. Thus, in the given example, the outage estimator estimates a number of premises 62 with power and a number of premises 62 without power for lateral (N,2) to lateral (N,J) in a similar manner.

Thus, upon completion of the first and second stage of analysis, most (or all) of the power grid 52 is evaluated. Based on the results of the first stage analysis and the second stage analysis, the outage estimator 72 can determine the estimated number of premises 62 with power and the estimated number of premises 62 without power accordingly. Additionally, the outage data is provided to the map system 71.

The map system 71 can cross-reference a unique identifier (e.g., IP address) and/or a logical position of each smart meter 64 with a civic address and/or geographical coordinates (e.g., latitude and longitudinal coordinates) to determine the geographical location of each premises 62 associated with each smart meter 64. The map system 71 analyzes and aggregates the outage data to generate visual indicia (e.g., heat spots) on the map output to represent a power state of areas (e.g., areas with power and areas without power). Moreover, the map system 71 can scale the visual indicia to represent a power state for a plurality of premises 62 in a given area that varies based on a size of the geographical area being viewed in the map.

Figure 2:
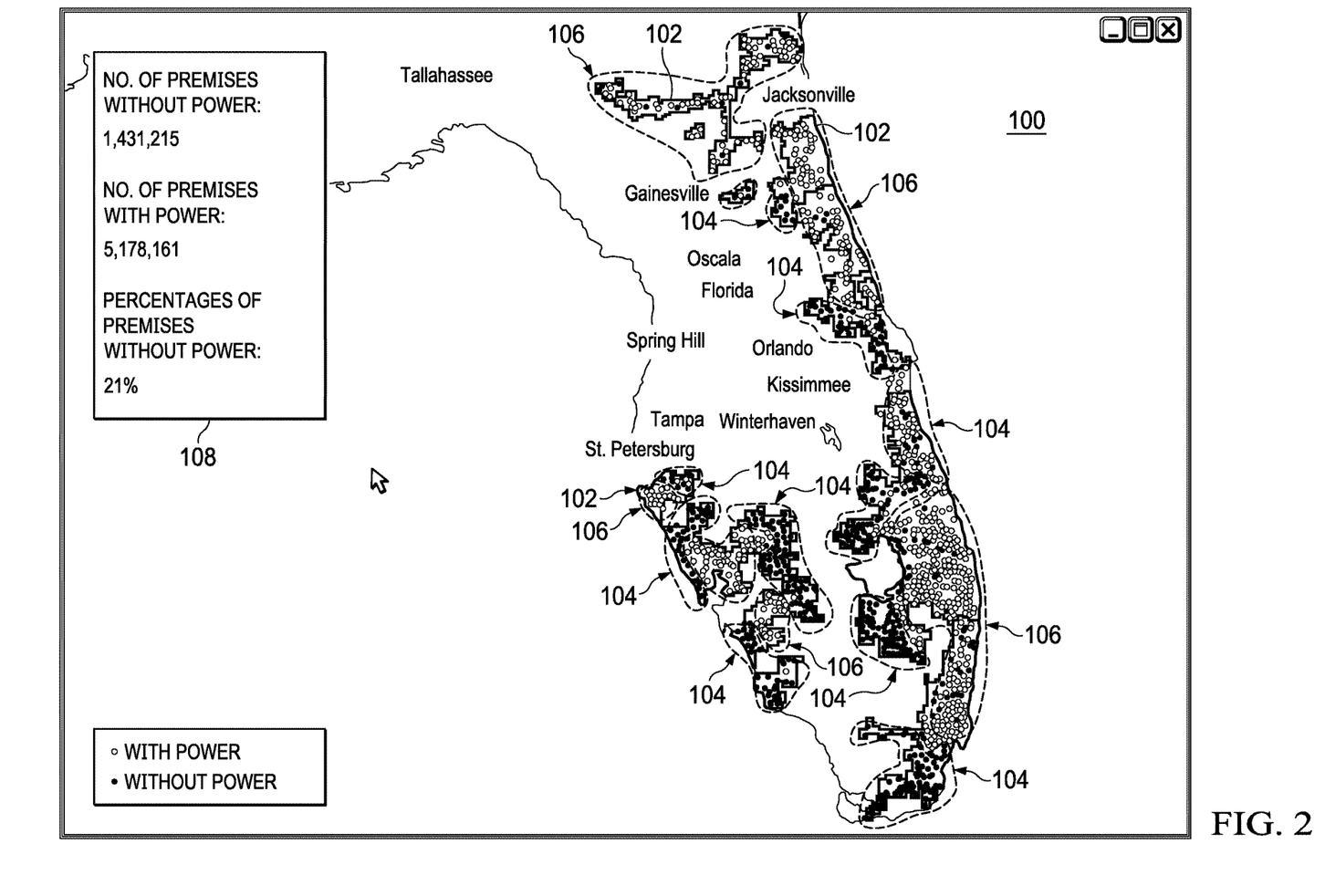
FIG. 2 illustrates an example of a screenshot of a map system with visual indicia representing a compounded power state for a plurality of premises serviced by a power grid in a region of interest.

FIG. 2 illustrates an example of a screenshot of a map 100 with visual indicia representing a compounded power state for a plurality of premises serviced by a power grid in a region of interest that could be output by the map system 71. The map 100 includes a geographic region (e.g., with political boundaries). Additionally, the map 100 includes service boundaries 102 that represent area within the geographic region that are being serviced by the power grid 52 of FIG. 1.

The map 100 includes visual indicia (e.g., hotspots) that represents areas within the boundaries 102 that have a particular power state. For example, the map 100 includes a first color of dots (e.g., red dots) that each indicate a predetermined number of premises 62 that are without power and a second color of dots (e.g., green dots) that each indicate the predetermined number of premises 62 of FIG. 1 that have power. The predetermined number varies based on a scale of the map 100.

As illustrated, in many examples (e.g., during or after a major environmental event), clusters of visual indicia with the same color appear. For example, in the map 100, outage regions (clusters) 104 represent areas where a percentage of premises 62 of FIG. 1 that are without power exceed a threshold (e.g., about 40%). Similarly, in the map 100, power clusters 106 represent areas where the percentage of premises 62 that are without power are below the threshold, indicating that most (e.g., about 60% or more) premises within a power cluster 106 have power.

Additionally, the map 100 includes information 108 (e.g., a text box) characterizing an estimated number of premises that are without power and an estimated number of premises that have power, which information can be retrieved in from the outage data. Further, in some examples, the information 108 could include a percentage of premises without power.

Referring back to FIG. 1, in some examples, the map system 71 may include options (e.g., user controls) that allow a viewer of the map to request service for a particular area. For instance, in some examples, the map system 71 can provide an interface that allows a user to request a trouble ticket for an area in the map. As one example, the user could request a trouble ticket for one or more of the outage cluster 104 in the map 100 of FIG. 2. The request could be provided to a ticket control 76. In some examples, the request can include information such as a logical position and/or (physical) location of a grid component of the power grid 52 associated with the trouble ticket. For instance, the request could identify a feeder 54, a lateral 56, and/or a transformer 60 for the trouble ticket.

In response, the ticket control 76 can generate a trouble ticket that initiates dispatch of a service crew to attempt to remedy problems that cause power outages. Additionally, the outage estimator 72 continues to monitor the status of the power grid 52 for new event messages in the first stage and/or second stage analysis that might indicate that power has been restored on a grid element of the power grid 52. In some examples, the outage estimator 72 can be configured to detect a trouble ticket and execute the first stage and/or second stage analysis on grid elements that might be associated with the trouble ticket. For instance, if a trouble ticket is issued for a specific feeder 54 and a smart meter 64 associated with a premises 62 downstream from the specific feeder 54 had previously been marked as being a premises 62 without power, the outage estimator 72 can re-execute the first stage analysis and/or the second stage analysis for the specific feeder 54 associated with the premises 62. In this manner, the outage data can be updated as service crews restore power to portions of the power grid 52.

Additionally or alternatively, the map system 71 can record instances of the outage data over a period of time (e.g., 1-30 days). In such a situation, the map system 71 can include a playback feature that allows a viewer (e.g., a user) generate a map that changes over the period of time. Such a map could allow the viewer to see how power is restored to the premises 62 over the period of time.

By employment of the system 50, an accurate estimate of number of premises 62 without power can be determined without needing to ping every smart meter. Additionally, the estimated power state for the premises 62 is based on actual pings of smart meters 64 rather than mere logical rules. Moreover, the map system 71 can provide a map that illustrates regions (e.g., outage areas) that have a relatively high number of premises 62 without power. In this manner, prioritization of the dispatching of crews can be executed in an efficient manner. In particular, in some examples, service crews may be dispatched to a relatively large outage area prior to dispatching to a smaller outage area, since repair of a single grid element (e.g., a feeder 54 or lateral 56) in the larger outage area may have a greater impact on an overall number of premises 62 without power than repair of a grid element at the smaller outage area.

Figure 3:
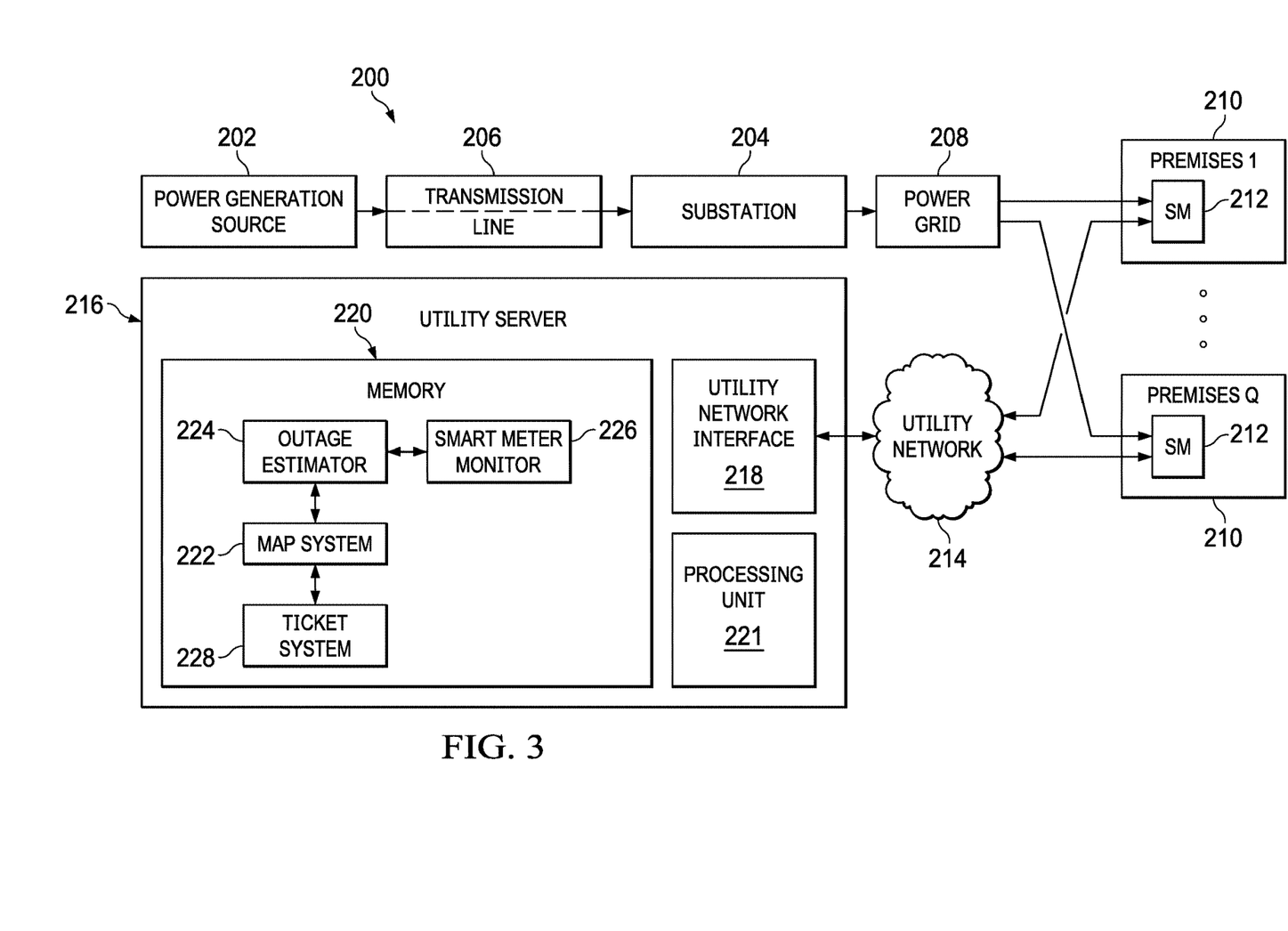
FIG. 3 illustrates another example of an electric power distribution system that includes an outage estimator that estimates a power state for premises serviced by a power grid.

FIG. 3 illustrates another example of an electric power distribution system 200 that can estimate a power state of premises. The electric power distribution system 200 can include a power generation source 202 that can generate electric power. The power generation source 202 could be representative of a power plant, such as a fossil fuel or coal-fired plant, a nuclear plant, a wind farm and/or a solar array and attendant constituent structures or any combination thereof. The power generation source 202 can transmit a high-voltage, alternating current (AC) power (such as a 115 or 220 kilovolt (kV) AC power) to a substation 104 via a transmission line 206 (e.g., an electric power line).

The substation 204 can transform the high voltage AC power into a mid-voltage power. For example, it may be desirable in some circumstance to step down (or to step up) voltage via one or more substation 204 electrical components, to phase-shift and/or otherwise to adjust current phase or amplitude, for instance, to achieve a desired power function as specified by the kind of load and/or to minimize energy lost in the electric power distribution system 200. As one example, the substation 204 may include electrical components (transformers) for transforming and conditioning a 115 kV AC power into 41.6 and/or 12.47 kV AC power. In another example, the substation 104 may include electrical components for transforming and conditioning 220 kV AC power into 66 kV AC power. It is to be appreciated that in yet other examples, different input and output voltages could be implemented. It is noted that the electric power distribution system 200 may include more than one power generation source 202 and/or more than one substation 204. The substation 204 can distribute electric power to a power grid 208 that can be formed of feeders, laterals and transformers, such as the power grid 52 illustrated and described with respect to FIG. 1.

Elements of the power grid 208 can transform the mid-voltage power into low-voltage consumer power, such as 110-220 V AC power that is provided to a corresponding Q number of premises 210 (e.g., domiciles, office buildings or industrial complexes), where Q is an integer greater than one. Each of the Q number of premises 210 can have a smart meter 212 labeled in FIG. 2 as "SM" installed therein. The premises 210 can also be referred to as customer premises. In many examples, there may be hundreds, thousands or millions of premises 210.

Each of the smart meters 212 can be configured to measure electric power consumed at each corresponding premises 210 and generate network messages related to usage data (e.g., data characterizing metered electric power usage) at a particular premises 210. In some examples, the smart meter 212 at each of the Q number of premises 210 may be configured to be operated in accordance with the Advanced Metering Infrastructure (or "AMI") specifications or protocols. Accordingly, the smart meters 212 may be referred to as "AMI meters". In other examples, the smart meters 212 can be configured to operate in accordance with a different protocol. In operation, the smart meters 212 can monitor, sense, record to track electrical consumption (or "usage") digitally and at predetermined and/or dynamically adjustable intervals.

Additionally, the Q number of smart meters 212 can transmit usage data (e.g., via a secure radio frequency band) to other devices installed on or otherwise communicably coupled to the power grid 208 or to a communications network (such as a utility network 214), where the smart meters 212 exchange data. In such a situation, the term "usage data" can refer to raw data (e.g., unmodified or unprocessed data as they are collected and that represent the amount of electrical energy consumed (e.g., consumption data), incoming voltage (e.g., a voltage reading) at the location metered by the smart meters 212 and/or to data and other information related to or derived from the raw data (e.g., readings and/or data points that may be time-stamped or otherwise processed to provide information in addition to an aggregate or a measure of cumulative consumption). In some examples, an aggregate usage value may be transmitted from a given smart meter 212, and in other examples, detailed, time-dependent usage rates may be transmitted from the given smart meter 212. The specific type and amount of data collected and processed at, and transmitted from the smart meter 212 can be application-specific and may vary in accordance with processing or computational capabilities of hardware components deployed, as well as software functionalities implemented at or in cooperation with the smart meters 212.

The Q number of smart meters 212 can be communicably coupled to the utility network 214 such that (network) messages including usage data collected (and possibly processed) by the smart meters 212 may be transmitted to the utility network 214. The utility network 214 can be, for example, a mesh network or a point-to-point network. In some examples, the utility network 214 can be an AMI network. In some examples, the utility network 214 can be implemented as a packet-switched network, such as an Internet Protocol (IP) network, including an IP version 6 (IPv6) network.

In some examples, each smart meter 212 (or some subset thereof) can include a battery-backup. In this manner, each smart meter 212 can send and receive messages on the utility network 214 even in situations where the associated premises 210 is without power (experiencing a power outage).

A utility server 216 (e.g., a computer system) can also be connected to the utility network 214 via a utility network interface 218 (e.g., a network interface card). The utility server 216 can be implemented by a utility provider (e.g., a power provider), such as a utility provider that controls the power generation source 202. The utility server 216 can include memory 220 to store machine executable instructions. The memory 220 can be implemented as a non-transitory machine readable medium. The memory 220 could be volatile memory (e.g., random access memory), non-volatile memory (e.g., a hard drive, a solid state drive, flash memory, etc.) or a combination thereof. The utility server 216 can include a processing unit 221 (e.g., one or more processor cores) that accesses the memory 220 and executes the machine readable instructions.

In some examples, the utility server 216 can be (physically) implemented at facilitates controlled by the utility provider. In such a situation, the utility server 216 could be representative of multiple servers (e.g., a server farm). Additionally or alternatively, the utility server 216 (or a portion thereof) can be implemented in a remote computing system, such as a computing cloud. In such a situation, features of the utility server 216, such as the processing unit 221, the network interface 218, and the memory 220 could be representative of a single instance of hardware or multiple instances of hardware with applications executing across the multiple of instances (i.e., distributed) of hardware (e.g., computers, routers, memory, processors, or a combination thereof). Alternatively, the utility server 216 could be implemented on a single dedicated computing device.

The utility network 214 can, in some examples, be implemented on (e.g., connected to) a public network, such as the Internet, a private network (e.g., a proprietary network) or a combination thereof (e.g., a private network coupled to the Internet). In this manner, the utility server 216 can establish bi-directional communication with each of the Q number of smart meters 212 (or some subset thereof) via the utility network 214.

The memory 220 stores application software for controlling operations of the utility provider. For example, the memory 220 stores application software for processing and billing systems, various monitoring, customer service, troubleshooting, maintenance, load balancing, accounting, and other types of activities that may be used to operate a utility provider.

The memory 220 includes a map system 222 executing thereon. The map system 222 is programmed to provide a GUI (graphical user interface) that outputs a map depicting a representation of a geographic area serviced by the power grid 208, or a partition thereof. The map system 71 could be implemented, for example, as a mapping system that outputs visual indicia (e.g., heat spots and/or icons) representing an outage status for premises 210 in the map. In particular, in response to user input and/or automatically, the map system 222 can request outage data from an outage estimator 224 stored in the memory 220. The request can include a service boundary depicted by the map (e.g., the service boundary 102 illustrated in FIG. 2), which service boundary can be changed in response to user input (e.g., zoom in or zoom out).

The outage estimator 224 is programmed to generate the outage data that characterizes an estimated power state for the Q number of premises 210 serviced by the power grid 208 or some subset thereof. The outage data can be stored in one or more electronic records (e.g., records of a database). In particular, the outage data includes an outage number that represents an estimate of the number of the Q number of premises 210 that are currently without power (experiencing a power outage) and an estimate of a number of the Q number of premises 210 that have power. As described herein, the outage data is updated in real-time (e.g., about every ten minutes) such that the outage data provides a relatively accurate estimate of the number of the Q number of premises 210 that are without power and a relatively accurate estimate of the number of premises 210 that have power.

In some examples, the map system 222 requests the outage data (including the outage number) in response to detection of a major environmental event that is likely to affect power service of the power grid 208. Additionally or alternatively, the map system 222 could be programmed to request the outage data for other reasons. Further, in some examples, the outage estimator 224 may be programmed to generate the outage data for reasons other than receiving the request.

The outage estimator 224 cooperates with a smart meter monitor 226 to generate the outage data. The smart meter monitor 226 communicates with the smart meters 212 at each of the premises 210 coupled to the power grid 208 via the utility network 214. In particular, the smart meter monitor 226 records event messages that may be periodically and/or asynchronously provided from the smart meters 64 at each of the premises 62. The event messages can include usage data for an associated premises 62. Additionally, the smart meter monitor 226 can ping (e.g., a status check request) the smart meters 212 at each of the premises 210 for usage data. In response to receipt of a ping, a given smart meter 212 provides the usage data to the smart meter monitor 226 via the utility network 214. The usage data can indicate an input (incoming) voltage observed by the given smart meter 212 and consumption data that characterizes an amount of power (e.g., in kilowatts (kW)) consumed by the corresponding premises 210. It is understood that these examples are not meant to be limiting. In other examples, more or less information may be provided in response to a ping.

In some situations, an event message from a smart meter 212 at a particular premises 210 is without power (experiencing a power outage). For instance, in some examples, each smart meter 212 can include a capacitor that allows the smart meter 212 to continue to operate for a brief time (e.g., one (1) second or less) after a loss of power. In such a situation, if the smart meter 212 detects a loss of power, the smart meter 212 may generate a "last gasp" event message that indicates that the associated premises 210 is without power. It is also considered that if the smart meter 212 includes a battery backup, the smart meter 212 may provide usage data in an event message indicating that the smart meter 212 has 0 Volts (V) incoming, such that it is presumed that the particular premises 210 is without power (experiencing a power outage). Alternatively, if a smart meter 212 does not respond to a ping within a predetermined amount of time (a timeout) (e.g., about 10 minutes), the smart meter monitor 226 may record a lack of a response to a ping, and it may be presumed that the corresponding premises 210 is without power.

Moreover, as described herein, the outage estimator 224 sends requests for pings to specific smart meters 212 to the smart meter monitor 226. In response, the smart meter monitor 226 ping the specific smart meters 212 and forwards a response (or an indication of a lack of response) to the outage estimator 224. For purposes of simplification of explanation, further discussion of the generation of the ping in response to the request of the ping and the forwarding of the response to the request to the ping is omitted with respect to FIG. 3.

The outage estimator 224 generates and updates the outage data in stages of analysis. In the first stage analysis, the outage estimator 224 identifies feeders in the power grid 208 that are within the service boundary identified by the map system 222. The outage estimator 224 queries the smart meter monitor 226 for the most recent smart meter event messages for smart meters 212 associated with a first set of feeders that are within the service boundary defined by the map system 222. For the first feeder in a first set of the feeders within the service boundary, the outage estimator 224 parses the meter event messages to identify a most upstream smart meter 212 that indicates a power outage, which most upstream smart meter 212 is associated with a first premises 210.

The outage estimator 224 requests that the smart meter monitor 226 ping the (most upstream) smart meter 64 of the first premises with event messages. The outage estimator 224 receives the usage data generated in response to the requested ping. If the usage data indicates that the first premises 210 associated with the most upstream premises 210 has power, the outage estimator 224 requests a ping to a smart meter 212 of a second premises 210 coupled to the same transformer (a given transformer) as the (most upstream) smart meter 212 of the first premises 210. If the returned usage data indicates that the second premises 210 has power, the outage estimator 224 presumes that all of the premises 210 electrically coupled to the given transformer have power. In this situation, the outage estimator 224 records the status of the associated transformer in the power grid 208 as being online (having power) in the outage data. Additionally, the outage estimator 224 records each premises 210 coupled to the given transformer of the power grid 208 as having power in the outage data.

If the a timeout to ping (no response to a ping) indicates that the first premises 210 does not have power (experiencing a power outage), the outage estimator 224 requests a ping to a smart meter 212 on a second premises 210 on the same transformer. If a timeout to ping (no response to a ping) indicates that the second premises 210 does not have power service, the outage estimator 224 presumes that the given transformer of the power grid 208 does not have power. In this situation, the given transformer is recorded in the outage data as being offline (experiencing a power outage). Additionally, in this situation, the outage estimator 224 records each of the Q number of premises 210 coupled to the given transformer to the number of premises as being without power in the outage data.

In other situations, if usage data indicates that the smart meter 212 of the first premises 210 has power service but that the second premises 210 is without power, or vice versa, the outage estimator 224 requests individual pings of the smart meter 212 for each premises 210 coupled to the given transformer of the power grid 208. The results of the individual pings (usage data or a timeout) are employed by the outage estimator 224 to record the power status for the premises 210 corresponding to the pinged smart meters 212 for the outage data. Additionally, the outage estimator 224 marks the given transformer of the power grid 208 as having an unknown or indeterminate status.

Upon estimating the power status for each premises 210 coupled to the given transformer, the outage estimator 224 evaluates a status of premises 210 associated with other transformers on the first feeder.

Evaluation of the premises 210 coupled to the other transformers is similar to the evaluation of the premises 210 of the given transformer. In particular, for each downstream transformer the outage estimator 224 requests pings for two smart meters 212 at two premises 210. If results of the pings indicate that both premises 210 have power, the outage estimator 224 marks the associated transformer of the power grid 208 as being online (having power) in the outage data. Additionally, in this situation, the outage estimator 224 records each of the associated premises 210 as having power in the outage data. If the results of the pings indicate that both premises 210 are without power, the outage estimator 224 marks the associated transformer 60 as being offline (power outage) in the outages. Additionally, in this situation, the outage estimator 224 records each of the associated premises 210 as being without power in the outage data.

Additionally, if the results of the pings indicates that one of the premises 210 has power and the other premises 210 is without power, the outage estimator 224 request pings of each smart meter 212 of the associated transformer and records individual ping results in the outage data.

Upon evaluating the smart meters 212 attached to each transformer of the first feeder in the power grid 208, the outage estimator 224 repeats the first stage analysis for each feeder within the service boundary provided by the map system 222 for which recent (e.g., within 10-60 minutes) event messages smart meters 212 are reported. The results of the first stage analysis is employed to determine the outage data.

Additionally, the outage estimator 224 also executes a second stage analysis to generate/refine the outage data. In the second stage analysis, the outage estimator 224 evaluates regions of the power grid 208 wherein smart meters 212 have not sent recent (e.g., within 10-60 minutes) event messages. That is, the outage estimator 224 skips the sections of the power grid 208 that were analyzed in the first stage of analysis. In situations where portions of the power grid 208 go offline (lose power), some of the smart meters 212 may not have sufficient power to send event messages. Accordingly, in the second stage of analysis, the outage estimator 224 requests pings of smart meters 212 associated with grid elements of the power grid 208 that were not evaluated in the first stage of analysis. The grid elements could be, for example, feeders, laterals and/or transformers.

For instance, for each feeder analyzed in the second stage analysis, the outage estimator 224 requests pings for smart meters 212 on each of associated laterals of the feeder, starting at a nearest (in logical position) to a feeder head. For a given lateral, the outage estimator 224 requests pings for the first and last smart meters 212 (in logical position) of the given lateral. The results of the ping (or lack thereof) are employed by the outage estimator 224 to update the outage data in a manner described herein.

In particular, if both smart meters 212 of the premises 210 provide usage data indicating the both of the premises 210 have power, the outage estimator 224 presumed that every premises 210 coupled downstream from the a corresponding lateral has power. Thus, the outage estimator 224 records the power status for each premises 210 coupled downstream from the corresponding lateral as having power in the outage data. Alternatively, if both smart meters 212 of the premises 210 provide usage data (or a timeout) indicating the both of the premises 210 are without power, the outage estimator 224 presumes that every premises 210 coupled downstream to the corresponding lateral of the feeder is without power. Moreover, the outage estimator 224 records each premises 210 coupled downstream from the corresponding lateral as being without power in the outage data.

As another alternative, if the usage data (or a timeout) for one of the smart meters 212 of the premises 210 has power and one of the smart meters 212 is without power, the outage estimator 224 requests a ping for one smart meter 212 for each transformer on the lateral 56. Moreover, the outage estimator 224 presumes that if the response to the ping indicates that a given premises 210 has power, that the associated transformer is online (has power) and that each premises 210 associated with that transformer also has power. Conversely, if the smart meter 212 indicates that a given premises 210 is without power, the outage estimator 224 presumes and records in the outage data that the transformer is offline (has no power) and that each premises 210 associated with that transformer is also without power. Moreover, the outage estimator 224 updates/refines the outage data accordingly. The outage estimator 224 evaluates each lateral 56 for the associated feeder examined in the second stage analysis in a similar manner.

Upon completion of the first and second stage of analysis, most (or all) of the power grid 208 is evaluated. Therefore, the estimated number of premises 210 with power and the estimated number of premises without power 212 of the outage data can be calculated and/or updated by the outage estimator 224 accordingly. Thus, the outage data is provided to the map system 222.

In response, the map system 222 can cross-reference a unique identifier (e.g., IP address) and/or a logical position of each smart meter 212 with a civic address and/or geographical coordinates (e.g., latitude and longitudinal coordinates) to determine the geographical location of each premises 210 associated with each smart meter 212. The map system 222 analyzes and aggregates the outage data to generate visual indicia (e.g., heat spots) on the map output to represent areas with power and areas without power. Moreover, the map system 222 can scale the visual indicia to represent a plurality of premises 210 in a given area that varies based on a size of the geographical area being viewed in the map. The map output by the map system 222 could be similar (or different) from the map 100 illustrated in FIG. 2.

Moreover, upon viewing the map (a GUI) output by the map system 222, a user of the map can employ user controls to select a request for a trouble ticket. The request for the trouble ticket can be employed by a ticket system 228 to deploy service crews to remedy power outages identified in the map. In some examples, the outage estimator 224 can be configured to detect a trouble ticket and execute the first stage and/or second stage analysis on grid elements that might be associated with the trouble ticket. For instance, if a trouble ticket is issued for a specific feeder of the power grid 208 and a smart meter 212 associated with a premises 210 downstream from the specific feeder had previously been marked as being a premises 210 without power, the outage estimator 222 may be configured to re-execute the first stage analysis and/or the second stage analysis for the specific feeder associated with the premises 210. In this manner, the outage data can be updated as service crews restore power to portions of the power grid 208. Alternatively, the updating of the outage data may be executed periodically and/or asynchronously by the outage estimator 222. The execution of updates to the outage data ensures that work that restores power to a subset of the premises 210 (by execution of a trouble ticket) is accurately reflected in the map output by the map system 222.

Additionally or alternatively, the map system 222 may be programmed record instances of the outage data over a period of time (e.g., 1-30 days). In such a situation, the GUI output by the map system 222 can include a playback feature that allows a viewer (e.g., a user) generate a map that changes over the period of time. The playback feature outputs an animation of visual indicia that represent a plurality of instances of the outage data recorded over the period of time. Such a map could allow the viewer to see how power is restored to the premises 62 over the period of time.

By employment of the system 200, the outage data can accurately estimate the number of premises 210 that have power and the number of premises 210 that are without power at a given time. Moreover, the first and second stage analysis employed by the outage estimator 224 obviates the need to ping every smart meter 212 individually to generate the outage data.

Figure 4:
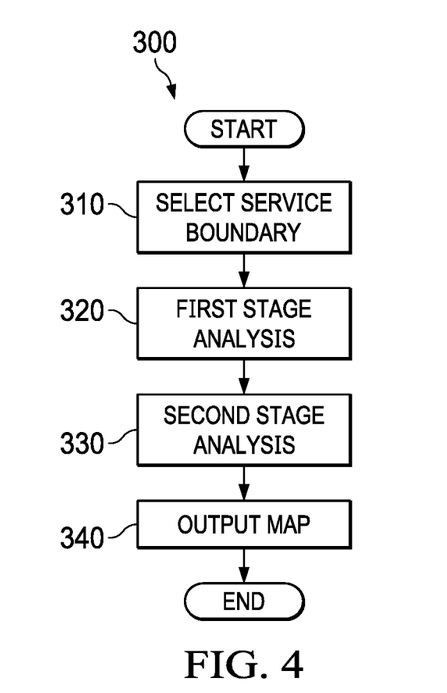
FIG. 4 illustrates a flowchart of an example method for generating outage data characterizing a power state of premises serviced by a power grid.
Figure 5:
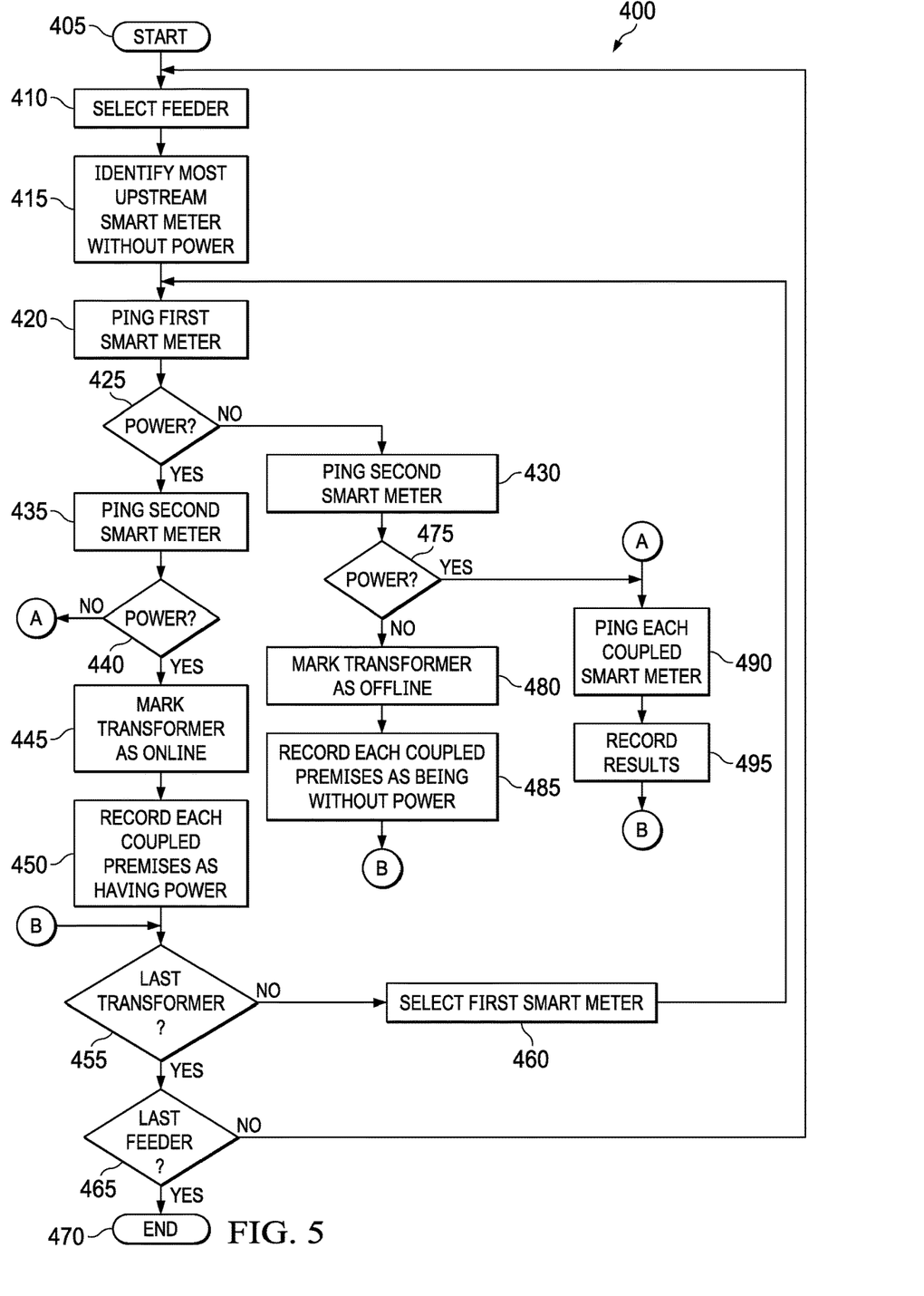
FIG. 5 illustrates a sub-method for a first stage analysis for generating the outage data for the method of FIG. 4.
Figure 6:
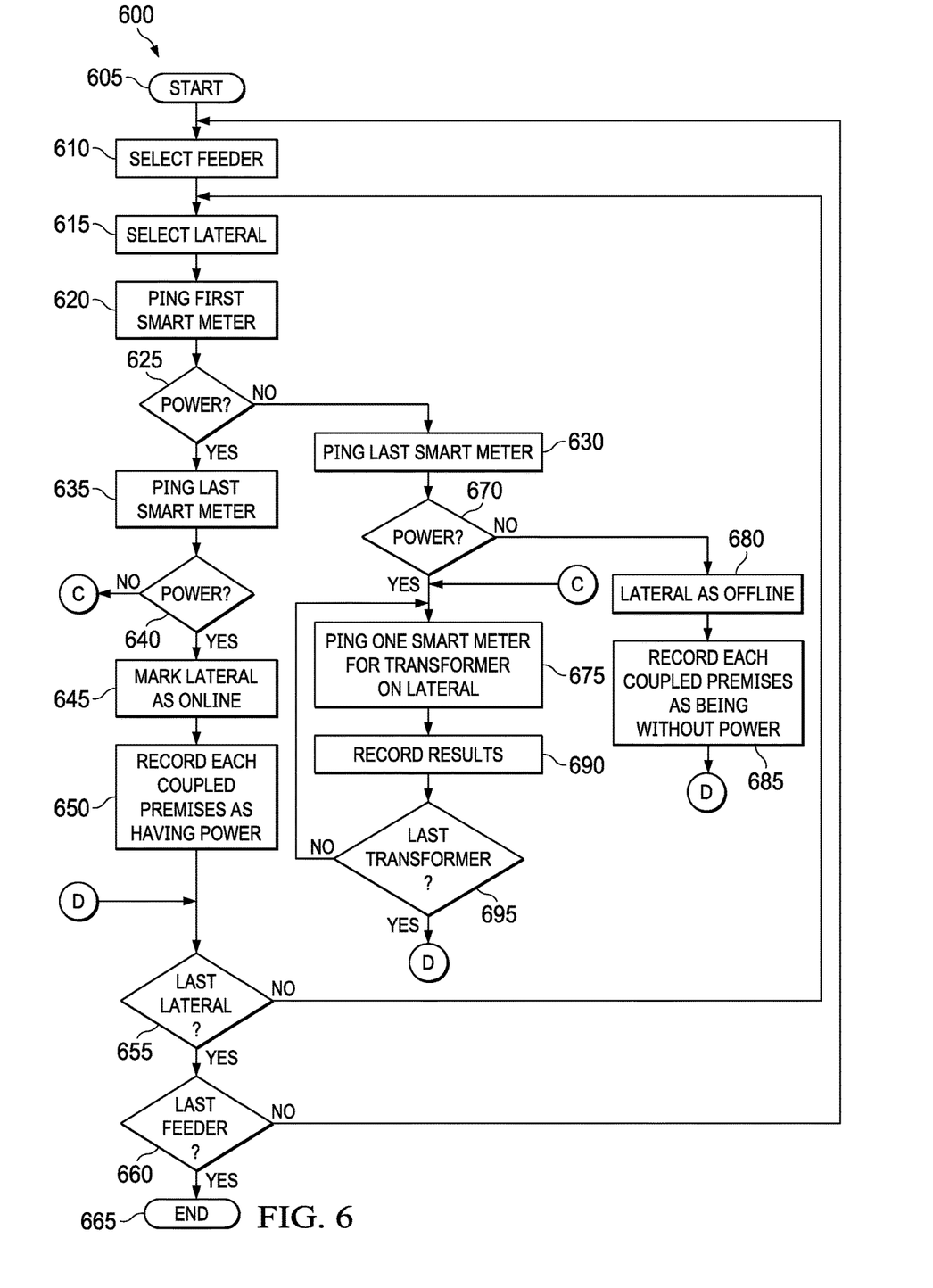
FIG. 6 illustrates a sub-method for a second state analysis for generating/refining the outage data for the method of FIG. 4.

In view of the foregoing structural and functional features described above, an example method will be better appreciated with reference to FIGS. 4-6. While, for purposes of simplicity of explanation, the example method of FIG. 4-6 are shown and described as executing serially, it is to be understood and appreciated that the present examples are not limited by the illustrated order, as some actions could in other examples occur in different orders, multiple times and/or concurrently from that shown and described herein. Moreover, it is not necessary that all described actions be performed to implement a method.

FIG. 4 illustrates a flowchart of an example method 300 for generating and outage data and outputting a map that characterizes the outage data. The method 300 could be implemented, for example, by a utility server that include, such as the utility server 69 illustrated in FIG. 1 and/or the utility server 216 of FIG. 2.

At 310, a map system (e.g., the map system 71 of FIG. 1) selects a service boundary for outage data. The service boundary defines a region serviced by a power grid that is to be evaluated. At 320, an outage estimator executes a first stage analysis on the region within the service boundary to determine the outage data. FIG. 5 illustrates a sub-method 400 that could be employed in the first stage analysis. At 330, the outage estimator executes a second stage analysis on the region to refine the outage data. FIG. 6 illustrates a sub-method 600 that could be employed in the second stage analysis. At 340, the map system outputs a map (e.g., the map 100 of FIG. 2) that characterizes the outage data generated by the outage estimator.

FIG. 5 illustrates the sub-method 400 for the first stage analysis to generate outage data that is executed by the outage estimator. At 405, the method 400 starts and proceeds to 410. At 410, the outage estimator selects a feeder for the first stage analysis. The selection at 410 can be based, for example, on an identification of event messages from smart meters (e.g., a smart meter 64 of FIG. 1) that provide an indication of a power status of associated premises (e.g., the premises 62) coupled downstream from the feeder. At 415, the outage estimator identifies a most upstream smart meter (a first smart meter) of the selected feeder that is associated with a first premises that provided an instance of the event message.

At 420, the outage estimator requests a ping of the first smart meter. At 425, a determination is made as to whether the first premises associated with the first smart meter has power. If the determination at 425 is negative (e.g., NO), the method 400 proceeds to 430. If the determination at 425 is positive (e.g., YES), the method 400 proceeds to 435.

At 435, a second smart meter coupled to a same transformer (a given transformer) as the first smart meter is pinged. At 440, a determination is made as to whether a second premises associated with the second smart meter has power. If the determination at 440 is positive (e.g., YES), the method 400 proceeds to 445. If the determination at 440 is negative (e.g., NO), the method 400 proceeds to Node A. At 445, the outage estimator marks the given transformer (common to the first and second smart meters) as being online (having power), since both the first and second premises have power (as determined at 425 and 440). At 450, the outage estimator records each premises coupled to the given transformer as having power for the outage data. At 455, a determination is made as to whether the given transformer is the last transformer of the selected feeder. If the determination at 455 is negative (e.g., NO), the method 400 proceeds to 460. If the determination at 460 is positive (e.g., YES), the method proceeds to 465. At 465, a determination is made as to whether the selected feeder is the last feeder to be analyzed in the first stage analysis. If the determination at 465 is negative (e.g., NO), the method 400 returns to 410. If the determination at 464 is positive (e.g., YES), the method ends at 470. At 460, a (next) first smart meter of a next downstream transformer (another given transformer) is selected, and the method 400 returns to 420.

At 430 (from a negative determination at 425), the outage estimator requests a ping of the second smart meter associated with a same transformer (a given transformer) as the first smart meter, and the method proceeds to 475. At 475, a determination is made as to whether a second premises associated with the second meter has power. If the determination at 475 is negative (e.g., NO), the method 400 proceeds to 480. If the determination at 475 is positive (e.g., YES), the method 400 proceeds to 490. At 480, the outage estimator marks the given transformer as offline (without power) since both the first and second premises are without power (as determined at 425 and 475). At 485, the outage estimator records each premises that is coupled to the given transformer as being without power for the outage data, and the method proceeds to 455 via Node B.

At 490 (from node A or from a positive determination at 475), the outage estimator requests a ping for each smart meter coupled to the given transformer (common the first and second smart meters). At 495, results of each ping are recorded in the outage data, and the method 400 proceeds to Node B, which flows to 455.

FIG. 6 illustrates the sub-method 600 for the second stage of analysis to generate/refine the outage data that is executed by the outage estimator. At 605, the method 600 starts and proceeds to 610. At 610, the outage estimator selects a feeder for the second stage analysis. The selection at 610 can be based, for example, on an determination that event messages have not been received from smart meters (e.g., a smart meter 64 of FIG. 1) for each selected feeder within a predetermined amount of time (e.g., 10-60 minutes). At 615, the outage estimator selects a lateral on the selected feeder. In some examples, the selected lateral is the most upstream lateral that has not been previously evaluated.

At 620, the outage estimator requests a ping of a first (most upstream) smart meter associated with a first premises of the selected lateral. At 625, a determination is made as to whether the first premises has power. If the determination at 625 is negative (e.g., NO), the method proceeds to 630. If the determination at 625 is positive (e.g., YES), the method 600 proceeds to 635. At 635, the outage estimator requests a ping of a last smart meter (further downstream) associated with a last premises of the selected lateral. At 640, a determination is made as to whether the last premises has power. If the determination at 640 is negative (e.g., NO), the method 600 proceeds to Node C. If the determination at 640 is positive (e.g., YES), the method 600 proceeds to 645. At 645, the outage estimator marks the selected lateral as being online (having power). At 650, the outage estimator records each premises coupled (directly or indirectly) to the selected lateral as having power for the outage data.

At 655 a determination is made as to whether the selected lateral is the last lateral in the selected feeder. If the determination is negative (e.g., NO), the method returns to 615. If the determination at 655 is positive (e.g., YES), the method 600 proceeds to 660. At 660, a determination is made as to whether the selected feeder is the last feeder in the second stage analysis. If the determination at 660 is negative (e.g., NO), the method 600 returns to 610. If the determination at 660 is positive (e.g., YES), the method 600 proceeds to 665, and the method 600 ends.

At 630 (from a negative determination at 625), the outage estimator requests a ping for the last smart meter associated with the last premises on the selected feeder. At 670, the outage estimator makes a determination as to whether the last premises has power. If the determination at 670 is positive (e.g., YES), the method 600 proceeds to 675. If the determination at 670 is negative (e.g., NO), the method proceeds to 680. At 680, the outage estimator marks the selected lateral as being offline, since both the first premises and the second premise are without power (as determined at 625 and 670). At 685, the outage estimator records each premise coupled (directly or indirectly) to the lateral as being without power for the outage data, and the method 600 proceeds to Node D, which flows to 655.

At 675, which flows from 670 or Node C, the outage estimator requests a ping for one smart meter on a selected transformer of the selected lateral. At 690, results of the ping are recorded. In particular, if the ping indicates that the premises associated with the smart meter (pinged at 675), is without power, the outage estimator records each premises coupled to the transformer as being without power for the outage data. Conversely, if the ping indicates that the premises associated with the smart meter (pinged at 675), has power, the outage estimator records each premises coupled to the transformer as having power for the outage data. At 695, the outage estimator makes a determination as to whether the selected transformer is the last transformer on the selected lateral. If the determination at 695 is negative (e.g., NO), the method 600 returns to 675. If the determination at 695 is positive (e.g., YES), the method 600 proceeds to Node D, which flows to 655.

What have been described above are examples. It is, of course, not possible to describe every conceivable combination of components or methodologies, but one of ordinary skill in the art will recognize that many further combinations and permutations are possible. Accordingly, the disclosure is intended to embrace all such alterations, modifications, and variations that fall within the scope of this application, including the appended claims. As used herein, the term "includes" means includes but not limited to, the term "including" means including but not limited to. The term "based on" means based at least in part on. Additionally, where the disclosure or claims recite "a," "an," "a first," or "another" element, or the equivalent thereof, it should be interpreted to include one or more than one such element, neither requiring nor excluding two or more such elements.

What is claimed is:

1. A non-transitory machine readable medium having machine executable instructions, the machine executable instructions comprising:

an outage estimation software module that generates outage data characterizing a power state for at least one thousand premises serviced by a power grid, the at least one thousand of the premises comprising a first set of the premises and a second set of the premises different from the first set of the premises, wherein the generating comprises:

executing a first stage analysis that estimates the power state for the first set of the premises associated with a set of transformers coupled to a first feeder in the power grid in response to detecting an event message from a smart meter associated with the first set of the premises; and executing a second stage analysis, after the execution of the first stage analysis, that estimates the power state for the second set of premises downstream from a set of laterals coupled to a second feeder in the power grid in response to detecting that no event messages have been provided from smart meters associated with the second set of the premises within a predetermined amount of time, wherein each lateral in the set of laterals is upstream from at least three premises in the at least one thousand premises, and wherein a given lateral of the set of laterals is determined to be without power when a first smart meter that is downstream and closest to the given lateral and a last smart meter that is downstream and furthest from the given lateral are determined to be without power.

2. The medium of claim 1, further comprising:
a map system that provides a boundary to the outage estimation software module, wherein the premises serviced by the power grid are located within the boundary.

3. The medium of claim 2, wherein the map system outputs a map comprising visual indicia characterizing the power state of the premises, wherein each visual indicia represents the power state for a plurality of the premises serviced by the power grid.

4. The medium of claim 3, wherein the map system outputs information characterizing an estimated number of the premises serviced by the power grid that have power and an estimated number of the premises serviced by the power grid that are without power.

5. The medium of claim 1, wherein in the executing of the first stage analysis, the outage estimation software module requests a ping of two smart meters associated with each transformer of the set of transformers associated with the first feeder, and the outage estimation software module employs the results of the pings to estimate a power state for premises coupled to a corresponding transformer in the set of transformers.

6. The medium of claim 5, wherein in response to ping results for a first meter and a second smart meter for a given transformer of the set of transformers indicating that premises associated with the first smart meter and the second smart meter are without power, the outage estimation software module records each premises coupled to the given transformer as being without power in the outage data.

7. The medium of claim 5, wherein in response to ping results for a first meter and a second smart meter for a given transformer of the set of transformers indicating that premises associated with the first smart meter and the second smart meter have power, the outage estimation software module records each premises coupled to the given transformer as having power the in the outage data.

8. The medium of claim 5, wherein in response to ping results for a first meter and a second smart meter for a given transformer of the set of transformers indicating that a first premises associated with the first smart meter has power and a second premises associated with the second smart meter is without power, the outage estimation software module requests a ping of a smart meter associated with each premises coupled to the given transformer.

9. The medium of claim 1, wherein in the executing of the second stage analysis, the outage estimation software module requests a ping of two smart meters associated with each lateral in the set of laterals associated with the second feeder, and the outage estimation software module employs the results of the pings to estimate a power state for each premises coupled to a corresponding lateral of the set of laterals associated with the second feeder.

10. The medium of claim 9, wherein in response to ping results for the first meter and the last smart meter for the given lateral of the set of transformers indicating that premises associated with the first smart meter and the last smart meter are without power, the outage estimation software module records each premises coupled to the given lateral as being without power in the outage data.

11. The medium of claim 9, wherein in response to ping results for a first meter and a last smart meter for a given lateral of the set of laterals indicating that a first premises associated with the first smart meter has power and a last premises associated with the last smart meter is without power, the outage estimation software module requests a ping of a smart meter associated with each transformer coupled to the given lateral.

12. The medium of claim 1, wherein the power state for a given premises serviced by the power grid indicates that the given premises has power or is without power.

13. The method of claim 1, wherein the outage estimation software module that generates outage data characterizing a power state for the at least one thousand premises serviced by the power grid prior to pinging every smart meter coupled to the power grid.

14. A system comprising:
a memory for storing machine executable instructions; and
a processing unit comprising one or more processor cores that access the memory and executes the machine readable instructions, the machine readable instructions comprising:
  a map system that generates a request for outage data for at least one thousand premises serviced by a power grid that are within a service boundary, the number of the premises comprising a first set of the premises and a second set of the premises different from the first set of the premises;
  a smart meter monitor that sends pings to and receives event messages from smart meters installed at the number of the premises via a utility network; and
  an outage estimation software module that generates the outage data in response to the request, the outage data characterizing a power state for the number of the premises, wherein the generating comprising:
    executing a first stage analysis that estimates the power state for the first set of the premises associated with a set of transformers coupled to a first feeder in the power grid in response to detecting an event message from a smart meter associated with the first set of the premises; and
    executing a second stage analysis, after the execution of the first stage analysis, that estimates the power state for the second set of the premises downstream a set of laterals coupled to a second feeder in the power grid in response to detecting that no event messages have been provided from smart meters associated with the second set of the premises within a predetermined amount of time, wherein each lateral in the set of laterals is upstream from at least three premises in the at least one thousand premises, and wherein a given lateral of the set of laterals is determined to be without power when a first meter that is downstream and closest to the given lateral and a last meter downstream and furthest from the given lateral are determined to be without power.

15. The system of claim 14, wherein the map system outputs a map comprising visual indicia characterizing the power state of the number of premises, wherein each visual indicia represents the power state for a plurality the premises serviced by the power grid.

16. The system of claim 15, wherein the map system provides a playback that outputs an animation of a visual indicia that represent a plurality of different instances of the outage data over a period of time.

17. The system of claim 14, wherein in the executing of the first stage analysis, the outage estimation software module sends a requests for a ping of two smart meters associated with each transformer of the set of transformers associated with the first feeder to the smart meter monitor, and the outage estimation software module employs the results of the pings to estimate a power state for each premises coupled to a corresponding transformer in the set of transformers.

18. The system of claim 14, wherein in executing of the second stage analysis, the outage estimation software module requests a ping of a first smart meter and a last smart meter associated with each lateral in the set of laterals associated with the second feeder, and the outage estimation software module employs the results of the pings to estimate a power state for each premises coupled to the given lateral associated with the second feeder.

19. A method comprising:
receiving a request for outage data characterizing a power state for at least one thousand premises serviced by a power grid;
executing a first stage analysis for a first set of premises of the number of the premises coupled to a first feeder of the power grid to generate the outage data, wherein at least one event message from a smart meter coupled to the first feeder indicates that an associated premises is without power, wherein the executing of the first stage analysis comprises:
  requesting a ping for sets of two smart meters coupled to each transformer coupled to the first feeder and estimating the power state for the first set of premises of the number of the premises for the outage data based in part on the results of the pings to the sets of two smart meters coupled to each transformer;

executing a second stage analysis on a second feeder of the power grid, wherein no event messages have been received from smart meters coupled to the second feeder for a predetermined amount of time to refine the outage data, wherein the executing of the second stage analysis comprises:

requesting a ping for sets of two smart meters coupled to each lateral coupled to the second feeder and estimating the power state for a second set of premises of the number of the premises for the outage data based in part on the results of pings to the sets of two smart meters coupled to each lateral coupled to the second feeder, wherein each lateral in the set of laterals is upstream from at least three premises in the at least one thousand premises, and wherein a given lateral of the set of laterals is determined to be without power when a first meter that is downstream and closest to the given lateral and a last meter downstream and furthest from the given lateral are determined to be without power; and outputting a map characterizing the outage data.

20. The method of claim 19, wherein the map includes at least one cluster of visual indicia indicating that a plurality of premises in a given area are without power.

* * * * *

UNITED STATES PATENT AND TRADEMARK OFFICE
CERTIFICATE OF CORRECTION

Page 1 of 1

PATENT NO. : 10,655,984 B2
APPLICATION NO. : 15/848720
DATED : May 19, 2020
INVENTOR(S) : Eric Schwartz and Ronald Capute It is certified that error appears in the above-identified patent and that said Letters Patent is hereby corrected as shown below:

On the Title Page

Item (72) Please add Inventors:
Paul R. Hynes   Jupiter, FL (US)
Iliana M. Rentz West Palm Beach, FL (US)

Signed and Sealed this
Eighteenth Day of August, 2020

Andrei Iancu
*Director of the United States Patent and Trademark Office*